US012659784B2

(12) United States Patent
Koskinen et al.

(10) Patent No.: US 12,659,784 B2
(45) Date of Patent: Jun. 16, 2026

(54) METHODS AND APPARATUSES FOR CONTROLLING SMALL DATA TRANSMISSION ON UPLINK

(71) Applicant: Nokia Technologies Oy, Espoo (FI)

(72) Inventors: Jussi-Pekka Koskinen, Oulu (FI); Samuli Heikki Turtinen, Oulu (FI)

(73) Assignee: Nokia Technologies Oy, Espoo (FI)

( * ) Notice: Subject to any disclaimer, the term of this patent is extended or adjusted under 35 U.S.C. 154(b) by 327 days.

(21) Appl. No.: 18/553,568

(22) PCT Filed: Mar. 18, 2022

(86) PCT No.: PCT/EP2022/057096
§ 371 (c)(1),
(2) Date: Oct. 1, 2023

(87) PCT Pub. No.: WO2022/207355
PCT Pub. Date: Oct. 6, 2022

(65) Prior Publication Data
US 2024/0187914 A1     Jun. 6, 2024

(30) Foreign Application Priority Data
Mar. 30, 2021     (FI) ..................................... 20215368

(51) Int. Cl.
*H04W 28/02* (2009.01)
*H04W 76/27* (2018.01)
(52) U.S. Cl.
CPC ... *H04W 28/0221* (2013.01); *H04W 28/0278* (2013.01); *H04W 76/27* (2018.02)

(58) Field of Classification Search
CPC ......... H04W 28/0221; H04W 28/0278; H04W 72/23; H04W 72/53; H04W 76/27; H04W 88/02; H04W 88/08; Y02D 30/70
See application file for complete search history.

(56) References Cited

U.S. PATENT DOCUMENTS

| | | | |
|---|---|---|---|
| 12,101,819 B2 * | 9/2024 | Kim .................. | H04W 74/0836 |
| 2014/0148188 A1 | 5/2014 | Widell et al. | |
| 2019/0090298 A1 | 3/2019 | Abraham et al. | |
| 2020/0092905 A1 | 3/2020 | Vos et al. | |

(Continued)

FOREIGN PATENT DOCUMENTS

| | | |
|---|---|---|
| WO | 2018/084762 A1 | 5/2018 |
| WO | 2020/087325 A1 | 5/2020 |

(Continued)

OTHER PUBLICATIONS

"Work Item on NR smalldata transmissions in Inactive state", 3GPP TSG RAN Meeting #86, RP-193252, Agenda Item: 9.1.2, ZTE Corporation, Dec. 9-12, 2019, 4 pages.

(Continued)

*Primary Examiner* — Kashif Siddiqui
(74) *Attorney, Agent, or Firm* — Nokia Technologies Oy

(57) ABSTRACT

An apparatus determines, during a small data transmission procedure in an inactive state, whether amount of uplink data transmitted or to be transmitted exceeds a limit, which indicates amount of uplink data that the apparatus is at least allowed to transmit during the small data transmission procedure. Wireless network signals information indicating the limit.

9 Claims, 3 Drawing Sheets

(56) References Cited

U.S. PATENT DOCUMENTS

| | | | | |
|---|---|---|---|---|
| 2022/0039198 A1* | 2/2022 | Liu | ........................ | H04W 76/22 |
| 2022/0201794 A1* | 6/2022 | Fujishiro | ............... | H04W 76/27 |
| 2023/0038013 A1* | 2/2023 | Shi | ........................ | H04W 76/27 |
| 2023/0040049 A1* | 2/2023 | Fu | ........................ | H04W 76/27 |
| 2023/0379860 A1* | 11/2023 | Rao | ........................ | H04W 64/00 |
| 2023/0413345 A1* | 12/2023 | Yue | ................... | H04W 74/0875 |

FOREIGN PATENT DOCUMENTS

| | | |
|---|---|---|
| WO | 2020/088097 A1 | 5/2020 |
| WO | 2020/221861 A1 | 11/2020 |
| WO | 2021/049367 A1 | 3/2021 |

OTHER PUBLICATIONS

"3rd Generation Partnership Project; Technical Specification Group Radio Access Network; NR; Radio Resource Control (RRC) protocol specification (Release 16)", 3GPP TS 38.331, V16.3.1, Jan. 2021, pp. 1-932.

"3rd Generation Partnership Project; Technical Specification Group Radio Access Network; NR; Medium Access Control (MAC) protocol specification (Release 16)", 3GPP TS 38.321, V16.3.0, Dec. 2020, pp. 1-156.

"RACH based NR small data transmission", 3GPP TSG-RAN WG2 Meeting #111e, R2-2007540, Agenda item: 8.6.2, Qualcomm Incorporated, Aug. 17-28, 2020, pp. 1-5.

Office Action received for corresponding Finnish Patent Application No. 20215368, dated Oct. 11, 2021, 7 pages.

"Restrict frequency and amount of small data", 3GPP TSG SA WG3 (Security) Meeting #85, S3-161746, Agenda Item: 8.6.14, Huawei, Nov. 7-11, 2016, pp. 1-4.

"Summary of email discussion [NR-AH1#13][NR] UL data in Inactive", 3GPP TSG-RAN WG2 #97, R2-1701125, Agenda Item: 10.2.2.2, Huawei, Feb. 13-17, 2017, pp. 1-50.

Office Action received for corresponding Finnish Application No. 20215368, dated Mar. 21, 2022, 6 pages.

International Search Report and Written Opinion received for corresponding Patent Cooperation Treaty Application No. PCT/EP2022/057096, dated Jul. 25, 2022, 12 pages.

Office action received for corresponding Canadian Patent Application No. 3214157, dated Dec. 2, 2024, 5 pages.

Office action received for corresponding Canadian Patent Application No. 3,214,157, dated Oct. 16, 2025, 4 pages.

* cited by examiner

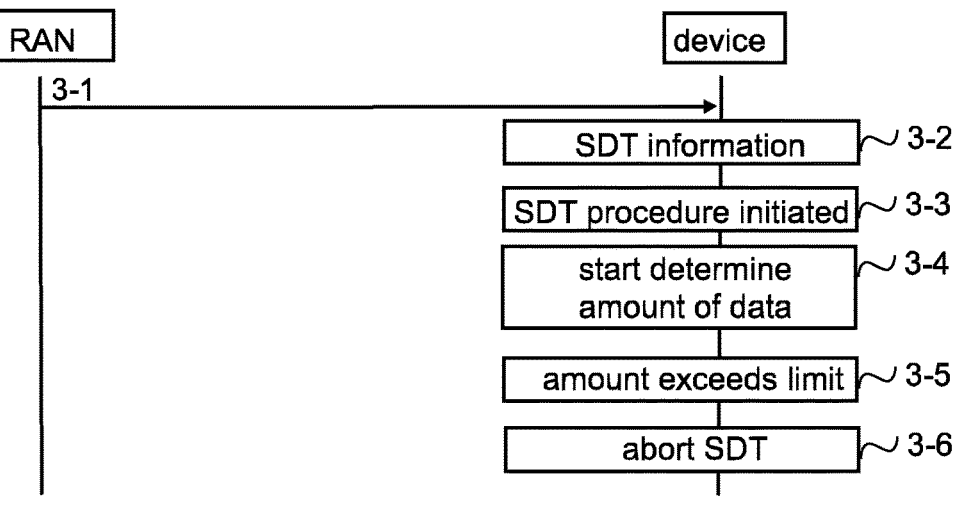
*FIG.3*
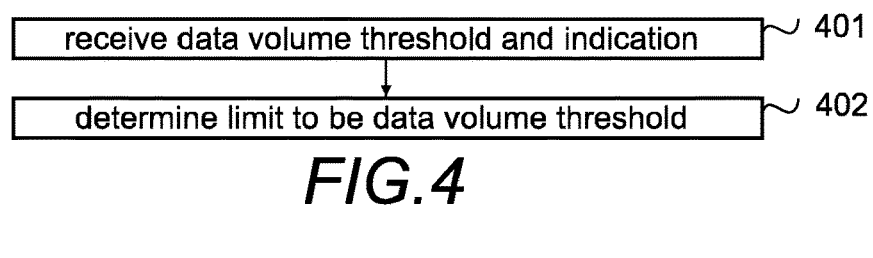
*FIG.4*
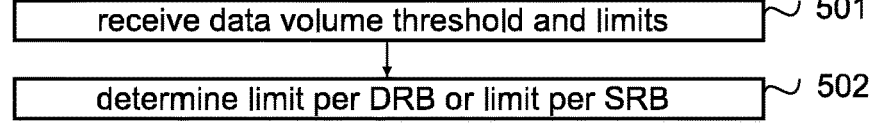
*FIG.5*
receive data volume threshold and delta ~ 601
determine limit to be data volume threshold + delta ~ 602
*FIG.6*
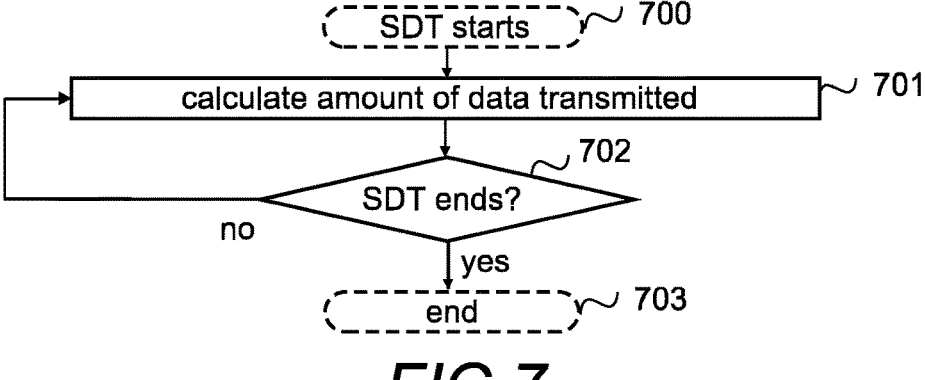
*FIG.7*

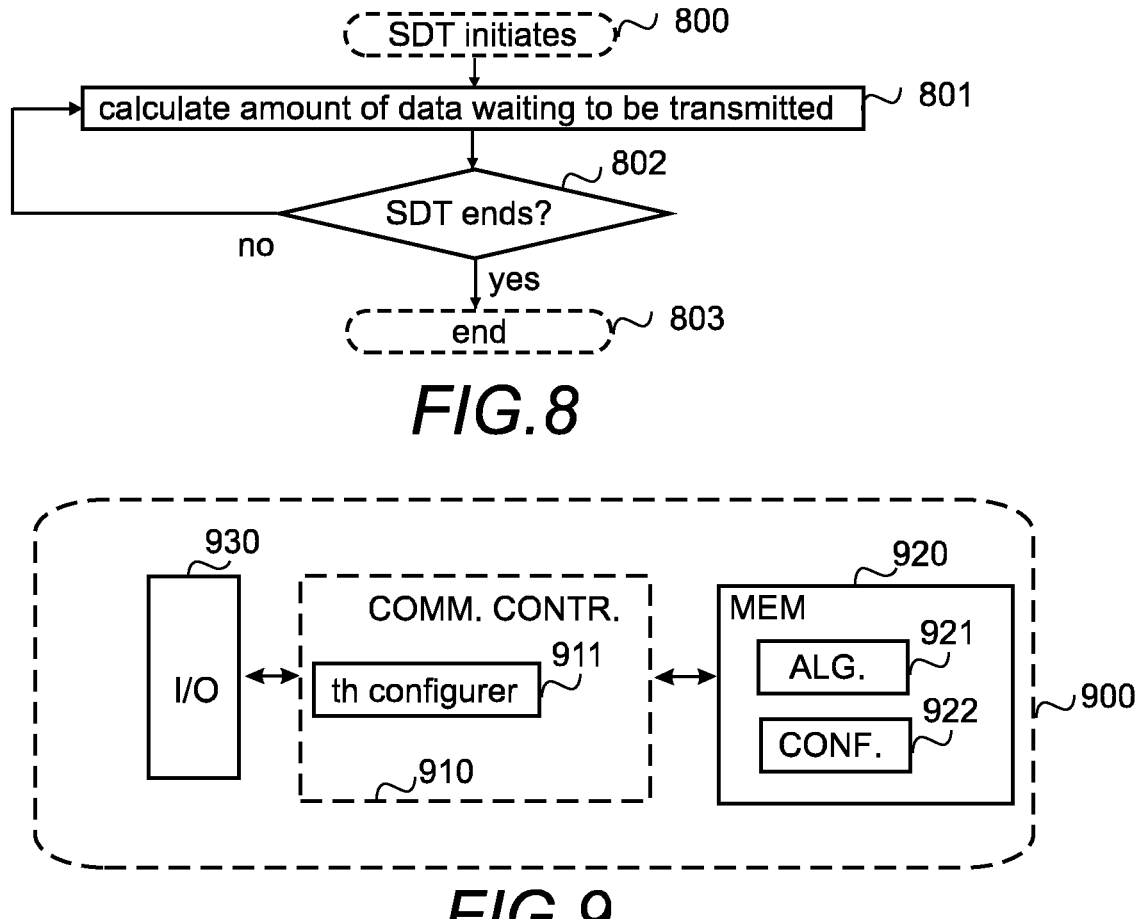
FIG.8
FIG.9
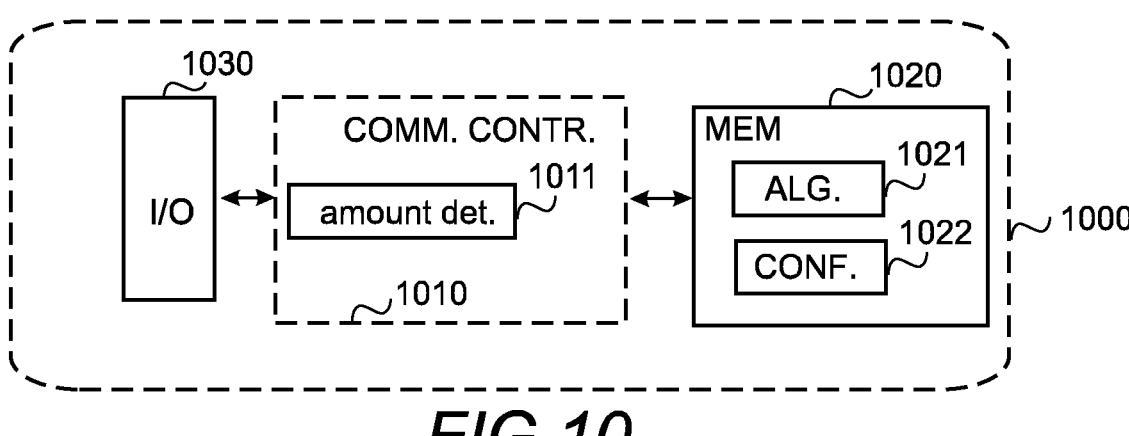
FIG.10

METHODS AND APPARATUSES FOR CONTROLLING SMALL DATA TRANSMISSION ON UPLINK

RELATED APPLICATION

This application was originally filed as PCT Application No. PCT/EP2022/057096, filed on Mar. 18, 2022, which claims priority from FI application No. 20215368, filed on Mar. 30, 2021, each of which is incorporated herein by reference in its entirety.

TECHNICAL FIELD

Various example embodiments relate to wireless communications.

BACKGROUND

Wireless communication systems are under constant development. For example, devices may transmit or receive a small amount of data in an inactive state to reduce signaling overhead from connection establishment, and to minimize power consumption.

BRIEF DESCRIPTION

The scope of protection sought for various embodiments is set out by the independent claims. The embodiments, examples and features, if any, described in this specification that do not fall under the scope of the independent claims are to be interpreted as examples useful for understanding various embodiments falling under the scope of the independent claims.

According to an aspect there is provided an apparatus comprising at least one processor; and at least one memory including computer program code, the at least one memory and computer program code being configured to, with the at least one processor, cause the apparatus at least to perform: receiving from a wireless network information for a small data transmission procedure in an inactive state, the information indicating at least one limit to be used during small data transmission procedures, a limit indicating amount of uplink data that the apparatus is at least allowed to transmit during one small data transmission procedure; and determining, during a small data transmission procedure in the inactive state, whether amount of uplink data transmitted or to be transmitted exceeds the limit.

In an embodiment, the at least one memory and computer program code are configured to, with the at least one processor, cause the apparatus further to at least to perform: determining, during the small data transmission procedure in the inactive state, the amount of uplink data to be transmitted by calculating at least one of amount of uplink data waiting to be transmitted, amount of uplink data becoming available to be transmitted during the small data transmission procedure, or amount of uplink data transmitted during the small data transmission procedure.

In an embodiment, the amount of uplink data comprises at least one of small data transmission data, non-small data transmission data, data for one or more small data transmission data radio bearers, data for one or more small data transmission signaling radio bearers, control plane data, user plane data, small data transmission data with headers, non-small data transmission data with headers, data for one or more small data transmission data radio bearers with headers, data for one or more small data transmission signaling radio bearers with headers, control plane data with headers, user plane data with headers.

In embodiments, the at least one memory and computer program code are configured to, with the at least one processor, cause the apparatus further to at least perform, in response to the amount exceeding the limit, at least one of aborting the using for the uplink data the small data transmission in the inactive state, causing transmitting a radio resource control resume request, causing transmitting a radio resource control setup request, causing triggering a buffer status report, indicating in a user equipment assistance information message a preferred radio resource control state to be radio resource control connected, or causing indicating in signaling that the amount exceeds the limit or causing radio resource control state transition to radio resource control idle.

In an embodiment, the at least one memory and computer program code are configured to, with the at least one processor, cause the apparatus to determine that the amount of the uplink data exceeds the limit in response to the amount of uplink data becoming available to be transmitted during the uplink data transmission causing that the limit is exceeded or in response to the amount of uplink data that has been transmitted exceeding the limit while there is still uplink data waiting to be transmitted.

In embodiments, the at least one memory and computer program code are configured to, with the at least one processor, cause the apparatus further to at least perform transmitting the uplink data using the small data transmission procedure if a permission to exceed the limit during the uplink data transmission is received from the wireless network.

In an embodiment, the permission is received in at least one of a control element in medium access control, a radio resource control message, an uplink grant or downlink transmission.

In embodiments, the at least one memory and computer program code configured to, with the at least one processor, cause the apparatus further to at least perform: determining, when receiving from the wireless network the information indicating at least one limit, a limit to be equal to a data volume threshold for initiating the small data transmission procedure in the inactive state, or to be equal to a further threshold in the information, or to be an indicated amount bigger than the data volume threshold.

According to an aspect there is provided an apparatus comprising at least one processor; and at least one memory including computer program code, the at least one memory and computer program code being configured to, with the at least one processor, cause the apparatus at least to perform: signaling to at least one device information for a small data transmission procedure in an inactive state, the information indicating at least one limit to be used during small data transmission procedures, a limit indicating amount of uplink data allowed to be transmitted during one small data transmission procedure.

In an embodiment, the at least one memory and computer program code are configured to, with the at least one processor, cause the apparatus further to at least perform: determining, in response to receiving from a device information indicating that the limit is exceeded, how the device continues uplink data transmission; and signaling to the device an indication how to continue the uplink data transmission.

In embodiments, the at least one limit is a general limit or a limit per a data radio bearer, or limit per a signaling radio bearer.

According to an aspect there is provided an apparatus comprising means for performing at least: receiving from a wireless network information for a small data transmission procedure in an inactive state, the information indicating at least one limit to be used during small data transmission procedures, a limit indicating amount of uplink data that the apparatus is at least allowed to transmit during one small data transmission procedure; and determining, during a small data transmission procedure in the inactive state, whether amount of uplink data transmitted or to be transmitted exceeds the limit.

According to an aspect there is provided an apparatus comprising means for performing: signaling to at least one device information for a small data transmission procedure in an inactive state, the information indicating at least one limit to be used during small data transmission procedures, a limit indicating amount of uplink data allowed to be transmitted during one small data transmission procedure.

According to an aspect there is provided a method comprising: receiving, in an apparatus, from a wireless network information for a small data transmission procedure in an inactive state, the information indicating at least one limit to be used during small data transmission procedures, a limit indicating amount of uplink data that the apparatus is at least allowed to transmit during one small data transmission procedure; and determining, by the apparatus, during a small data transmission procedure in the inactive state, whether amount of uplink data transmitted or to be transmitted exceeds the limit.

According to an aspect there is provided a method comprising: signaling, by an apparatus, to at least one device information for a small data transmission procedure in an inactive state, the information indicating at least one limit to be used during small data transmission procedures, a limit indicating amount of uplink data allowed to be transmitted during one small data transmission procedure.

According to an aspect there is provided a non-transitory computer-readable medium comprising program instructions, which, when run by an apparatus, causes the apparatus to to carry out at least: determining, during a small data transmission procedure in the inactive state, whether amount of uplink data transmitted or to be transmitted exceeds a limit indicated in information received from a wireless network for a small data transmission procedure in an inactive state, the limit indicating amount of uplink data that the apparatus is at least allowed to transmit during one small data transmission procedure.

According to an aspect there is provided a non-transitory computer-readable medium comprising program instructions, which, when run by an apparatus, causes the apparatus to to carry out at least: signaling to at least one device information for a small data transmission procedure in an inactive state, the information indicating at least one limit to be used during small data transmission procedures, a limit indicating amount of uplink data allowed to be transmitted during one small data transmission procedure.

According to an aspect there is provided a computer-readable medium comprising program instructions, which, when run by an apparatus, causes the apparatus to to carry out at least: determining, during a small data transmission procedure in the inactive state, whether amount of uplink data transmitted or to be transmitted exceeds a limit indicated in information received from a wireless network for a small data transmission procedure in an inactive state, the limit indicating amount of uplink data that the apparatus is at least allowed to transmit during one small data transmission procedure.

According to an aspect there is provided a computer-readable medium comprising program instructions, which, when run by an apparatus, causes the apparatus to to carry out at least: signaling to at least one device information for a small data transmission procedure in an inactive state, the information indicating at least one limit to be used during small data transmission procedures, a limit indicating amount of uplink data allowed to be transmitted during one small data transmission procedure.

According to an aspect there is provided a computer program comprising instructions which, when the program is executed by an apparatus, cause the apparatus to carry out at least: determining, during a small data transmission procedure in the inactive state, whether amount of uplink data transmitted or to be transmitted exceeds a limit indicated in information received from a wireless network for a small data transmission procedure in an inactive state, the limit indicating amount of uplink data that the apparatus is at least allowed to transmit during one small data transmission procedure.

According to an aspect there is provided a computer program comprising instructions which, when the program is executed by an apparatus, cause the apparatus to carry out at least signaling to at least one device information for a small data transmission procedure in an inactive state, the information indicating at least one limit to be used during small data transmission procedures, a limit indicating amount of uplink data allowed to be transmitted during one small data transmission procedure.

BRIEF DESCRIPTION OF DRAWINGS

Embodiments are described below, by way of example only, with reference to the accompanying drawings, in which

FIGS. 2 and 3 illustrate examples of information exchange;

FIGS. 4 to 8 illustrate example functionalities; and

FIGS. 9 and 10 are schematic block diagrams.

DETAILED DESCRIPTION OF SOME EMBODIMENTS

The following embodiments are examples. Although the specification may refer to "an", "one", or "some" embodiment(s) in several locations, this does not necessarily mean that each such reference is to the same embodiment(s), or that the feature only applies to a single embodiment. Single features of different embodiments may also be combined to provide other embodiments. Furthermore, words "comprising" and "including" should be understood as not limiting the described embodiments to consist of only those features that have been mentioned and such embodiments may contain also features/structures that have not been specifically mentioned. Further, although terms including ordinal numbers, such as "first", "second", etc., may be used for describing various elements, the structural elements are not restricted by the terms. The terms are used merely for the purpose of distinguishing an element from other elements. For example, a first element could be termed a second element, and similarly, a second element could be also termed a first element without departing from the scope of the present disclosure.

Embodiments and examples described herein may be implemented in any communications system comprising wireless connection(s). In the following, different exemplifying embodiments will be described using, as an example of an access architecture to which the embodiments may be applied, a radio access architecture based on new radio (NR, 5G) or long term evolution advanced (LTE Advanced, LTE-A), without restricting the embodiments to such an architecture, however. It is obvious for a person skilled in the art that the embodiments may also be applied to other kinds of communications networks having suitable means by adjusting parameters and procedures appropriately. Some examples of other options for suitable systems are the universal mobile telecommunications system (UMTS) radio access network (UTRAN or E-UTRAN), long term evolution (LTE, the substantially same as E-UTRA), beyond 5G, wireless local area network (WLAN or WiFi), worldwide interoperability for microwave access (WiMAX), Bluetooth®, personal communications services (PCS), ZigBee®, wideband code division multiple access (WCDMA), systems using ultra-wideband (UWB) technology, sensor networks, mobile ad-hoc networks (MANETs) and Internet Protocol multimedia subsystems (IMS) or any combination thereof.

Figure 1:
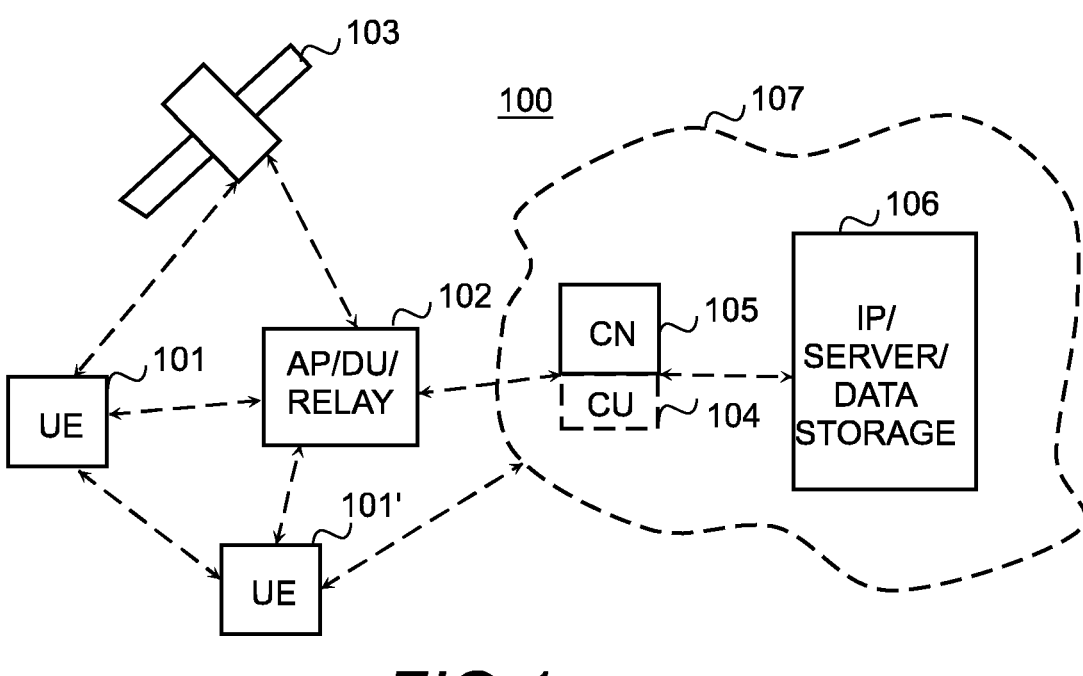
FIG. 1 illustrates an exemplified wireless communication system.

FIG. 1 depicts examples of simplified system architectures showing some elements and functional entities, all being logical units, whose implementation may differ from what is shown. The connections shown in FIG. 1 are logical connections; the actual physical connections may be different. It is apparent to a person skilled in the art that the system typically comprises also other functions and structures than those shown in FIG. 1.

The embodiments are not, however, restricted to the system given as an example but a person skilled in the art may apply the solution to other communication systems provided with necessary properties.

The example of FIG. 1 shows a part of an exemplifying radio access network.

FIG. 1 shows user devices 101 and 101' configured to be in a wireless connection on one or more communication channels in a cell with an access node (such as (e/g)NodeB) 102 providing the cell. The physical link from a user device to a (e/g)NodeB is called uplink or reverse link and the physical link from the (e/g)NodeB to the user device is called downlink or forward link. It should be appreciated that (e/g)NodeBs or their functionalities may be implemented by using any node, host, server or access point (AP) etc. entity suitable for such a usage.

A communications system 100 typically comprises more than one (e/g)NodeB in which case the (e/g)NodeBs may also be configured to communicate with one another over links, wired or wireless, designed for the purpose. These links may be used for signaling purposes. The (e/g)NodeB is a computing device configured to control the radio resources of communication system it is coupled to. The NodeB may also be referred to as a base station, an access point or any other type of interfacing device including a relay station capable of operating in a wireless environment. The (e/g)NodeB includes or is coupled to transceivers. From the transceivers of the (e/g)NodeB, a connection is provided to an antenna unit that establishes bi-directional radio links to user devices. The antenna unit may comprise a plurality of antennas or antenna elements. The (e/g)NodeB is further connected to core network 105 (CN or next generation core NGC). Depending on the system, the counterpart on the CN side can be a serving gateway (S-GW, routing and forwarding user data packets), packet data network gateway (P-GW), for providing connectivity of user devices (UEs) to external packet data networks, or mobile management entity (MME), etc.

The user device (also called UE, user equipment, user terminal, terminal device, etc.) illustrates one type of an apparatus to which resources on the air interface are allocated and assigned, and thus any feature described herein with a user device may be implemented with a corresponding apparatus, such as a relay node. An example of such a relay node is a layer 3 relay (self-backhauling relay) towards the base station.

The user device typically refers to a portable computing device that includes wireless mobile communication devices operating with or without a subscriber identification module (SIM), including, but not limited to, the following types of wireless devices: a mobile station (mobile phone), smartphone, personal digital assistant (PDA), handset, device using a wireless modem (alarm or measurement device, etc.), laptop and/or touch screen computer, tablet, game console, notebook, and multimedia device. It should be appreciated that a user device may also be a nearly exclusive uplink only device, of which an example is a camera or video camera loading images or video clips to a network. A user device may also be a device having capability to operate in Internet of Things (IOT) network which is a scenario in which objects are provided with the ability to transfer data over a network without requiring human-to-human or human-to-computer interaction. The user device may also utilise cloud. In some applications, a user device may comprise a small portable device with radio parts (such as a watch, earphones or eyeglasses) and the computation is carried out in the cloud. The user device (or in some embodiments a relay node, such as a mobile termination (MT) part of the integrated access and backhaul (IAB) Node), is configured to perform one or more of user equipment functionalities. The user device may also be called a subscriber unit, mobile station, remote terminal, access terminal, user terminal or user equipment (UE) just to mention but a few names or apparatuses.

Various techniques described herein may also be applied to a cyber-physical system (CPS) (a system of collaborating computational elements controlling physical entities). CPS may enable the implementation and exploitation of massive amounts of interconnected ICT devices (sensors, actuators, processors microcontrollers, etc.) embedded in physical objects at different locations. Mobile cyber physical systems, in which the physical system in question has inherent mobility, are a subcategory of cyber-physical systems. Examples of mobile physical systems include mobile robotics and electronics transported by humans or animals.

Additionally, although the apparatuses have been depicted as single entities, different units, processors and/or memory units (not all shown in FIG. 1) may be implemented.

5G enables using, many more base stations or nodes or corresponding network devices than the LTE (a so-called small cell concept), including macro sites operating in co-operation with smaller stations and employing a variety of radio technologies depending on service needs, use cases and/or spectrum available. 5G mobile communications supports a wide range of use cases and related applications including video streaming, augmented reality, different ways of data sharing and various forms of machine type applications (such as (massive) machine-type communications (mMTC), including vehicular safety, different sensors and realtime control. 5G is expected to have multiple radio interfaces, namely below 6 GHZ, cmWave and mmWave, and also being integradable with existing legacy radio access technologies, such as the LTE. Integration with the LTE may be implemented, at least in the early phase, as a system, where macro coverage is provided by the LTE and 5G radio interface access comes from small cells by aggregation to the LTE. In other words, 5G is planned to support both inter-RAT operability (such as LTE-5G) and inter-RI operability (inter-radio interface operability, such as below 6 GHz-cmWave, below 6 GHz-cmWave-mmWave). One of the concepts considered to be used in 5G networks is network slicing in which multiple independent and dedicated virtual sub-networks (network instances) may be created within the substantially same infrastructure to run services that have different requirements on latency, reliability, throughput and mobility.

The current architecture in LTE networks is fully distributed in the radio and fully centralized in the core network. The low latency applications and services in 5G require to bring the content close to the radio which leads to local break out and multi-access edge computing (MEC). 5G enables analytics and knowledge generation to occur at the source of the data. This approach requires leveraging resources that may not be continuously connected to a network such as laptops, smartphones, tablets and sensors. MEC provides a distributed computing environment for application and service hosting. It also has the ability to store and process content in close proximity to cellular subscribers for faster response time. Edge computing covers a wide range of technologies such as wireless sensor networks, mobile data acquisition, mobile signature analysis, cooperative distributed peer-to-peer ad hoc networking and processing also classifiable as local cloud/fog computing and grid/mesh computing, dew computing, mobile edge computing, cloudlet, distributed data storage and retrieval, autonomic self-healing networks, remote cloud services, augmented and virtual reality, data caching, Internet of Things (massive connectivity and/or latency critical), critical communications (autonomous vehicles, traffic safety, real-time analytics, time-critical control, healthcare applications).

The communication system is also able to communicate with other networks, such as a public switched telephone network or the Internet 106, or utilise services provided by them. The communication network may also be able to support the usage of cloud services, for example at least part of core network operations may be carried out as a cloud service (this is depicted in FIG. 1 by "cloud" 107). The communication system may also comprise a central control entity, or a like, providing facilities for networks of different operators to cooperate for example in spectrum sharing.

Edge cloud may be brought into radio access network (RAN) by utilizing network function virtualization (NVF) and software defined networking (SDN). Using edge cloud may mean access node operations to be carried out, at least partly, in a server, host or node operationally coupled to a remote radio head or base station comprising radio parts. It is also possible that node operations will be distributed among a plurality of servers, nodes or hosts. Application of cloudRAN architecture enables RAN real time functions being carried out at the RAN side (in a distributed unit, DU 102) and non-real time functions being carried out in a centralized manner (in a centralized unit, CU 104).

It should also be understood that the distribution of labour between core network operations and base station operations may differ from that of the LTE or even be non-existent. Some other technology advancements probably to be used are Big Data and all-IP, which may change the way networks are being constructed and managed. 5G (or new radio, NR) networks are being designed to support multiple hierarchies, where MEC servers can be placed between the core and the base station or nodeB (gNB). It should be appreciated that MEC can be applied in 4G networks as well.

5G may also utilize satellite communication to enhance or complement the coverage of 5G service, for example by providing backhauling. Possible use cases are providing service continuity for machine-to-machine (M2M) or Internet of Things (IOT) devices or for passengers on board of vehicles, or ensuring service availability for critical communications, and future railway/maritime/aeronautical communications. Satellite communication may utilise geostationary earth orbit (GEO) satellite systems, but also low earth orbit (LEO) satellite systems, in particular megaconstellations (systems in which hundreds of (nano)satellites are deployed). At least one satellite 103 in the megaconstellation may cover several satellite-enabled network entities that create on-ground cells. The on-ground cells may be created through an on-ground relay node 102 or by a gNB located on-ground or in a satellite.

It is obvious for a person skilled in the art that the depicted system is only an example of a part of a radio access system and in practice, the system may comprise a plurality of (e/g) NodeBs, the user device may have an access to a plurality of radio cells and the system may comprise also other apparatuses, such as relay nodes, for example distributed unit (DU) parts of one or more IAB nodes, or other network elements, etc. At least one of the (e/g)NodeBs or may be a Home(e/g)nodeB. Additionally, in a geographical area of a radio communication system a plurality of different kinds of radio cells as well as a plurality of radio cells may be provided. Radio cells may be macro cells (or umbrella cells) which are large cells, usually having a diameter of up to tens of kilometers, or smaller cells such as micro-, femto- or picocells. The (e/g)NodeBs of FIG. 1 may provide any kind of these cells. A cellular radio system may be implemented as a multilayer network including several kinds of cells. Typically, in multilayer networks, one access node provides one kind of a cell or cells, and thus a plurality of (e/g) NodeBs may be needed to provide such a network structure.

For fulfilling the need for improving the deployment and performance of communication systems, the concept of "plug-and-play" (e/g) NodeBs has been introduced. Typically, a network which is able to use "plug-and-play" (e/g)Node Bs, includes, in addition to Home (e/g) NodeBs (H(e/g)nodeBs), a home node B gateway, or HNB-GW (not shown in FIG. 1). A HNB Gateway (HNB-GW), which is typically installed within an operator's network may aggregate traffic from a large number of HNBs back to a core network.

It is envisaged that number of devices, such as sensors, actuators and similar devices for (massive) machine-type communications, or smartphones with chatting apps, that will generate (transmit) small amounts of data frequently or infrequently, will increase exponentially. (It should be appreciated that the above list is a non-limiting list of examples of apparatuses that may transmit small amounts of data.) To reduce overhead from connection establishment, and to minimize power consumption, 5G and beyond, enables apparatuses to transmit a small amount of data in an inactive state, using a process called small data transmission procedure (small data transfer procedure). An apparatus in an inactive state may initiate the small data transmission procedure, if certain criteria are met. The criteria include that the amount of uplink data to be transmitted is smaller than a data volume threshold. In other words, using 5G termi-
nology, Small Data Transmission (SDT) is a procedure
allowing data transmission while remaining in RRC_INAC-
TIVE (i.e. without transitioning to RRC_CONNECTED
state). SDT is enabled on a radio bearer basis and can be
initiated by the UE only if less than a configured amount of
UL data awaits transmission.

In 5G, using in terminology in 5G, a new independent
RRC state, referred to as RRC_INACTIVE, is introduced in
addition to the existing states, RRC_CONNECTED and
RRC_IDLE, with a goal reduce UE power consumption by
alleviating the Control Plane (CP) procedures required at the
RRC state change and associated latency. RRC_INACTIVE
is a state where a UE remains in CM-CONNECTED and can
move within an area configured by NG-RAN (the RNA)
without notifying NG-RAN. In RRC_INACTIVE, the last
serving gNB node keeps the UE context and the UE-
associated NG connection with the serving AMF and UPF.
When a UE is in RRC_INACTIVE state, the radio connec-
tion is only suspended while the core network connectivity
is maintained active, i.e. UE is kept in Connection Manage-
ment (CM)-CONNECTED state. A UE Access Stratum (AS)
context (referred to as UE Inactive AS context) is stored at
both UE and RAN sides for the fast resume of a suspended
connection, including the latest radio bearer configuration
used for the data/signaling transmission, and importantly the
security keys and algorithms for integrity protection and
ciphering in the radio interface. Based on this retained
information, the UE can resume the radio connection with a
much lower delay and associated signaling overhead as
compared to a UE in RRC_IDLE state that needs to establish
a new connection to both the radio and core network.

Figure 2:
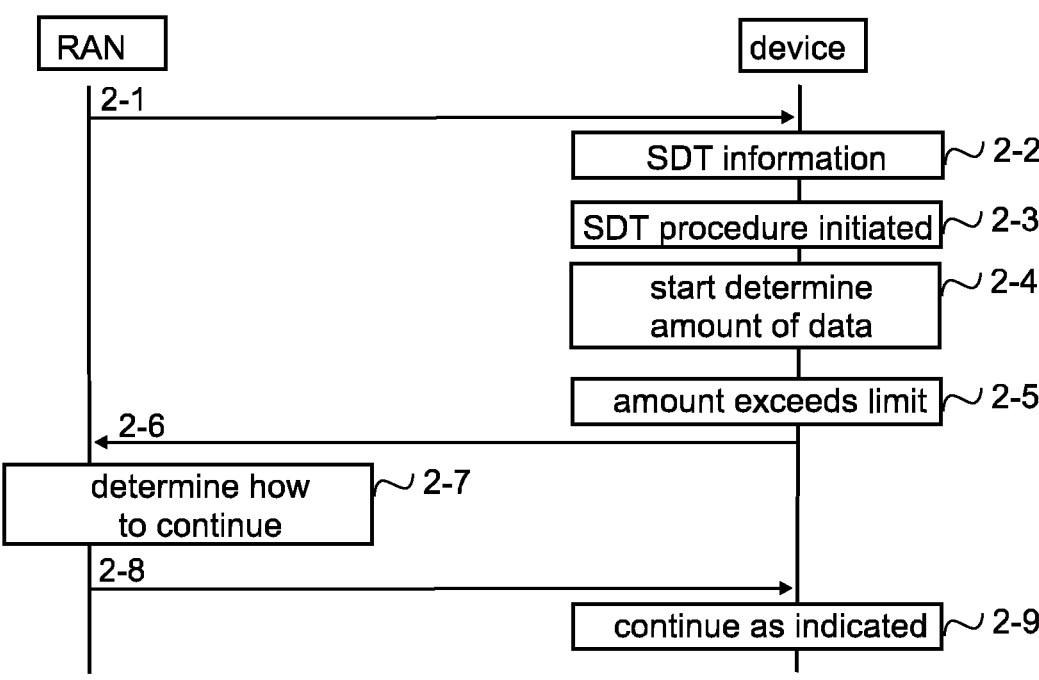

FIGS. 2 and 3 illustrate examples and functionality relat-
ing to information exchange for the small data transmission
procedure between a radio access network, for example an
access node in the radio access network, and an apparatus,
represented by a device. However, the actual small data
transmission procedure is not illustrated in the examples for
the sake of clarity. The actual small data transmission
procedure may comprise uplink random access MSGA/
MSG3 and/or subsequent data transmission (MSG3 is a first
scheduled transmission of the random access procedure, and
MSGA is preamble and payload transmissions of the random
access procedure for a two-step random access type). The
actual small data transmission procedure may comprise also
downlink transmission(s) after random access MSGA/
MSG3.

Referring to FIG. 2, the radio access network (RAN)
signals (message 2-1) to the device information for a small
data transmission procedure in an inactive state. The infor-
mation indicates at least one limit to be used during small
data transmission procedure(s), wherein a limit indicates
amount of uplink data that the apparatus is at least allowed
to transmit during one small data transmission procedure.
The information may comprise one or more thresholds,
and/or corresponding threshold-related information, for the
small data transmission procedure to have at least two
thresholds, or threshold values, one for deciding when to
initiate the procedure and at least information indicating at
least one limit (threshold) to be used during the procedure.
Such information for small data transmission procedures is
called herein, for a sake of clarity of description, a small data
transmission configuration. Further, for a sake of clarity of
description, one limit is used as an example of at least one
limit. Message 2-1 may be a broadcast or a dedicated
signaling, or, for example, the data volume threshold may be
broadcast and further threshold or threshold-related information (indication of one or more limits), are conveyed
using dedicated signaling or, for example, the data volume
threshold and further threshold or threshold-related infor-
mation are both broadcast or dedicated signaling or any
combinations of above. The value of the threshold and/or
limit may be determined by the network based on expected
size of background traffic data and/or delay tolerant data
and/or small data transmission data and/or data belonging to
small data transmission data radio bearer and/or data belong-
ing to small data transmission signaling radio bearer. It
should appreciated that the above are mere examples, and
any other criteria may be used, including a pre-agreed value.
Further, the value of the threshold and/or limit may be
dynamically set, for example the network may try with
different values to see what would be the most optimal
value(s) which do not cause small data transmission failures.
For example, network may first use rather big value(s) and
if small data transmission failures occur, the network may
start to use smaller values.

The device receives, in block 2-2, said small data trans-
mission (SDT) configuration, the configuration including a
limit, or indicating a limit, and in the illustrated example,
determines the limit. However, it should be appreciated that
if the received information comprises the limit, there may be
no separate determining. FIGS. 4 to 6 disclose detailed
examples how to determine the limit using the received
configuration. The limit may be called a threshold, but
herein term limit is used for the sake of clarity.

Then there is uplink user data to be transmitted, when the
device is in an inactive state. In the illustrated example, it is
assumed that the criteria to initiate the small data transmis-
sion procedure are met, and the small data transmission
procedure is initiated in block 2-3. The device starts in block
2-4 to determine the amount of uplink data transmitted
and/or to be transmitted, the determining including calcu-
lating the amount, for example as described with FIG. 7 or
8.

In the illustrated example of FIG. 2, the amount of uplink
data exceeds in block 2-5 the limit determined/received in
block 2-2 while there is still data to be transmitted, causing
the device to send message 2-6. Message 2-6 may be a radio
resource control resume request, or an UE (user equipment)
assistance information message indicating a preferred RRC
(radio resource control) state to be RRC connected, or other
indication in signaling indicating that the amount exceeds
the limit or causing radio resource control state transition to
radio resource control idle. For example, the indication may
be a new control element in medium access control signal-
ing, or in radio link control signaling, or a control packed
data unit in packet data convergence protocol, or a new radio
resource control message, or a new field in a radio resource
control message. If radio resource control message is used,
it may be conveyed via dedicated control channel, for
example in the system resource block 1 or in the system
resource block 2, in the small data transmission procedure.
Message 2-6 may, or may not, indicate the amount of data
waiting to be transmitted. Message 2-6 may be a buffer
status report, provided that it is triggered in response to the
amount exceeding the limit in block 2-5 and that an uplink
grant has been received from the network between block 2-5
and message 2-6.

When the radio access network receives message 2-6, it
determines in block 2-7 how the device can continue. For
example, depending on current load and service demand, the
radio access network may trigger a state transition for the
device to transit to a connected state, or the radio access
network may allow the device to continue to use the small data transition procedure. After determining, the radio access network signals (message 2-8) the device how to continue. If the device can continue to use the small data transmission procedure, the information (message 2-8) may be transmitted using downlink radio resource control message or a control element in medium access control or in an uplink grant or in any other downlink transmission. Further, message 2-6 may comprise an indication of how much more data can be transmitted using the small data transmission procedure.

The device continues in block 2-9 as indicated in signaling (message 2-9). If the device can continue to use the small data transmission procedure, the device may continue determining the amount of uplink data, or the device may determine the amount of uplink data transmitted and/or to be transmitted after receiving message 2-9, which may result, if new uplink data is generated to be transmitted during the determining, that the process restarts from block 2-5. In another implementation, the device may be configured not to use small data transmission procedure to the new uplink data becoming available during the small data transmission procedure.

The example illustrated in FIG. 3 is similar to the example illustrated in FIG. 2 to event in which the amount of uplink data exceeds in block 3-5 the limit while there is still data to be transmitted. In other words, message 3-1 corresponds to message 2-1 and blocks 3-2 to 3-5 correspond to blocks 2-2 to 2-5, and therefore they are not repeated in vain herein.

In the example of FIG. 3, when the amount of uplink data exceeds in block 3-5 the limit determined in block 3-1 while there is still data to be transmitted, the device aborts in block 3-6 the small data transmission procedure.

As can be seen from the examples of FIGS. 2 and 3, by determining the amount during the small data transmission procedure, a new uplink data arriving to a transmission buffer in the device while the small data transmission is ongoing, it is ensured that the device is not transmitting more uplink data using the small data transmission procedure than what the network considers appropriate. In other words, misuse of the small data procedure is prevented.

FIGS. 4 to 6 illustrate different examples how the device may determine the limit.

Referring to FIG. 4, the device receives in block 401 from the network, as a small data transmission configuration, one threshold, the data volume threshold. This implicitly indicates the limit, and the device determines in block 402 the limit to be the data volume threshold. In other words, in the illustrated example the device uses the data volume threshold through the whole small data transmission procedure.

Referring to FIG. 5, the device receives in block 501 from the network, as a small data transmission configuration, two or more thresholds, the data volume threshold and one or more further thresholds (limits) indicating the amount of data allowed to be transmitted during a small data transmission procedure. If one further threshold is received, it is a general threshold. If two or more further thresholds are received, the limit is determinable (configurable) per a data radio bearer (DRB) and/or per a signaling radio bearer (SRB). In the illustrated example of FIG. 5, two or more further thresholds are received, and the device determines in block 502 limits by setting a received further threshold per a data radio bearer to be a limit per a data radio bearer and/or by setting a received further threshold per a signaling radio bearer to be a limit per a signaling radio bearer.

Referring to FIG. 6, the device receives in block 601 from the network, as a small data transmission configuration, the data volume threshold and threshold related information, i.e.

one or more deltas indicating how much bigger the amount of data allowed to be transmitted during a small data transmission procedure is than the data volume threshold. In other words, the delta indicates how much more uplink data the device is allowed to transmit using the small data procedure. In the illustrated example it is assumed that a general delta is used, and the device determines in block 602 the limit to be the sum of the delta and the data volume threshold.

If the device receives more than one delta, for example a delta per a data radio bearer, or per a signaling radio bearer, corresponding limits will be determined in block 602.

It should be appreciated that if limits are determined per a radio bearer, determining the amount of uplink data is performed per a corresponding radio bearer.

FIGS. 7 and 8 illustrate different examples how to determine the amount of uplink data during the small data transmission. In both examples, the determining is performed by calculating.

Referring to FIG. 7, when the small data transmission procedure starts (block 700), the amount of uplink data is calculated in block 701. The uplink data may include, with or without headers, small data transmission data and/or non-small data transmission data and/or data for one or more small data transmission data radio bearers and/or data for one or more small data transmission signaling radio bearers and/or control plane data and/or user plane data. The calculating may be performed per a signaling radio bearer and/or per a data radio bearer, if limits are determined per a radio bearer. The calculating is performed (block 702: no returns the process to block 701) until (block 702: yes) the small data transmission procedure ends (block 703). In other words, the amount of uplink data transmitted during the small data transmission procedure is calculated.

Referring to FIG. 8, when the small data transmission procedure is initiated (block 800), the amount of uplink data waiting to be transmitted, for example in buffers, is calculated in block 801. The uplink data may include, with or without headers, small data transmission data and/or non-small data transmission data and/or data for one or more small data transmission data radio bearers and/or data for one or more small data transmission signaling radio bearers and/or control plane data and/or user plane data. The calculating may be performed per a signaling radio bearer and/or per a data radio bearer, if limits are determined per a radio bearer. The calculating is performed (block 802: no returns the process to block 801), to take into account new data becoming available to be transmitted, for example arriving to the buffers during the small data transmission procedure, until (block 802: yes) the small data transmission procedure ends (block 803). In other words, the amount of uplink data waiting to be transmitted, including data becoming available to be transmitted, during the small data transmission procedure is calculated.

The blocks, related functions, and information exchanges described above by means of FIGS. 2 to 8 are in no absolute chronological order, and some of them may be performed simultaneously or in an order differing from the given one. Other functions can also be executed between them or within them, and other information may be transmitted, and/or other rules applied or selected. Some of the blocks or part of the blocks or one or more pieces of information can also be left out or replaced by a corresponding block or part of the block or one or more pieces of information.

FIGS. 9 and 10 illustrate apparatuses comprising a communication controller 910, 1010 such as at least one processor or processing circuitry, and at least one memory 920,

1020 including a computer program code (software, algorithm) ALG. 921, 1021, wherein the at least one memory and the computer program code (software, algorithm) are configured, with the at least one processor, to cause the respective apparatus to carry out any one of the embodiments, examples and implementations described above. FIG. 9 illustrates an apparatus configured to provide wireless access and small data transmission threshold configurations to user devices, sensors, or any corresponding apparatus, supporting small data transmission in an inactive state, and FIG. 10 illustrates an apparatus for operating during small data transmission procedures as signaled by the apparatus in FIG. 9. The apparatuses of FIGS. 9 and 10 may be electronic devices, for example a wearable device, a home appliance device, a smart device, like smart phone or smart screen, a vehicular device, just to name couple of examples in addition to those listed with FIG. 1.

Referring to FIGS. 9 and 10, the memory 920, 1020 may be implemented using any suitable data storage technology, such as semiconductor based memory devices, flash memory, magnetic memory devices and systems, optical memory devices and systems, fixed memory and removable memory. The memory may comprise a configuration storage CONF. 921, 1021, such as a configuration database, for at least storing threshold-related configurations, including. The memory 920, 1020 may further store a data buffer for data waiting to be processed and transmitted.

Referring to FIG. 9, the apparatus, for example gNB, comprises a communication interface 930 comprising hardware and/or software for realizing communication connectivity according to one or more wireless and/or wired communication protocols. The communication interface 930 may provide the apparatus with radio communication capabilities with user devices (terminal devices, apparatuses) camping in one or more cells controlled by the apparatus, as well as communication capabilities towards a wired network.

Digital signal processing regarding transmission and reception of signals may be performed in a communication controller 910. The communication interface may comprise standard well-known components such as an amplifier, filter, frequency-converter, (de)modulator, and encoder/decoder circuitries and one or more antennas.

The communication controller 910 comprises a small data transmission threshold configuring processing circuitry 911 (th configurer) configured to provide different apparatuses with small data transmission configuration(s) according to any one of the embodiments/examples/implementations described above. The communication controller 910 may control the small data transmission threshold configuring processing circuitry 911.

In an embodiment, at least some of the functionalities of the apparatus of FIG. 9 may be shared between two physically separate devices, forming one operational entity. Therefore, the apparatus may be seen to depict the operational entity comprising one or more physically separate devices for executing at least some of the processes described with respect to the network.

Referring to FIG. 10, the apparatus 1000 may further comprise a communication interface 1030 comprising hardware and/or software for realizing communication connectivity according to one or more communication protocols. The communication interface 1030 may provide the apparatus 1000 with communication capabilities with the apparatus of FIG. 9. The communication interface may comprise standard well-known analog components such as an amplifier, filter, frequency-converter and circuitries, and conversion circuitries transforming signals between analog and digital domains. Digital signal processing regarding transmission and reception of signals may be performed in a communication controller 1010.

The communication controller 1010 comprises an amount determining processing circuitry 1011 (amount det.) for small data transmission procedures configured to use received small data transmission threshold configurations according to any one of the embodiments/examples/implementations described above. The amount determining processing circuitry 1011 may be configured to, in response to detecting that a threshold (limit) exceeds, abolish small data transmission procedure or signal information that threshold (limit) is exceeded according to any one of the embodiments/examples/implementations described above. The communication controller 1010 may control the amount determining processing circuitry 1011.

As used in this application, the term 'circuitry' refers to all of the following: (a) hardware-only circuit implementations, such as implementations in only analog and/or digital circuitry, and (b) combinations of circuits and software (and/or firmware), such as (as applicable): (i) a combination of processor(s) or (ii) portions of processor(s)/software including digital signal processor(s), software, and memory(ies) that work together to cause an apparatus to perform various functions, and (c) circuits, such as a microprocessor(s) or a portion of a microprocessor(s), that require software or firmware for operation, even if the software or firmware is not physically present. This definition of 'circuitry' applies to all uses of this term in this application. As a further example, as used in this application, the term 'circuitry' would also cover an implementation of merely a processor (or multiple processors) or a portion of a processor and its (or their) accompanying software and/or firmware. The term 'circuitry' would also cover, for example and if applicable to the particular element, a baseband integrated circuit or applications processor integrated circuit for a mobile phone or a similar integrated circuit in a server, a cellular network device, or another network device.

In an embodiment, at least some of the processes described in connection with FIGS. 2 to 8 may be carried out by an apparatus comprising corresponding means for carrying out at least some of the described processes. The apparatus may comprise separate means for separate phases of a process, or means may perform several phases or the whole process. Some example means for carrying out the processes may include at least one of the following: detector, processor (including dual-core and multiple-core processors), digital signal processor, controller, receiver, transmitter, encoder, decoder, memory, RAM, ROM, software, firmware, display, user interface, display circuitry, user interface circuitry, user interface software, display software, circuit, antenna, antenna circuitry, and circuitry. In an embodiment, the at least one processor, the memory, and the computer program code form processing means or comprises one or more computer program code portions for carrying out one or more operations according to any one of the embodiments/examples/implementations described herein.

According to yet another embodiment, the apparatus carrying out the embodiments/examples comprises a circuitry including at least one processor and at least one memory including computer program code. When activated, the circuitry causes the apparatus to perform at least some of the functionalities according to any one of the embodiments/examples/implementations of FIGS. 2 to 8, or operations thereof.

The techniques and methods described herein may be implemented by various means. For example, these techniques may be implemented in hardware (one or more devices), firmware (one or more devices), software (one or more modules), or combinations thereof. For a hardware implementation, the apparatus(es) of embodiments may be implemented within one or more application-specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof. For firmware or software, the implementation can be carried out through modules of at least one chip set (e.g. procedures, functions, and so on) that perform the functions described herein. The software codes may be stored in a memory unit and executed by processors. The memory unit may be implemented within the processor or externally to the processor. In the latter case, it can be communicatively coupled to the processor via various means, as is known in the art. Additionally, the components of the apparatuses (nodes) described herein may be rearranged and/or complemented by additional components in order to facilitate the achievements of the various aspects, etc., described with regard thereto, and they are not limited to the precise configurations set forth in the given figures, as will be appreciated by one skilled in the art.

Embodiments/examples/implementations as described may also be carried out in the form of a computer process defined by a computer program or portions thereof. Embodiments of the methods described in connection with FIGS. 2 to 8 may be carried out by executing at least one portion of a computer program comprising corresponding instructions. The computer program may be in source code form, object code form, or in some intermediate form, and it may be stored in some sort of carrier, which may be any entity or device capable of carrying the program. For example, the computer program may be stored on a computer program distribution medium readable by a computer or a processor. The computer program medium may be, for example but not limited to, a record medium, computer memory, read-only memory, electrical carrier signal, telecommunications signal, and software distribution package, for example. The computer program medium may be a non-transitory medium, for example. Coding of software for carrying out the embodiments as shown and described is well within the scope of a person of ordinary skill in the art. In an embodiment, a computer-readable medium comprises said computer program.

It will be obvious to a person skilled in the art that, as technology advances, the inventive concept may be implemented in various ways. The embodiments are not limited to the exemplary embodiments described above, but may vary within the scope of the claims. Therefore, all words and expressions should be interpreted broadly, and they are intended to illustrate, not to restrict, the exemplary embodiments.

ABBREVIATIONS

4G: fourth generation
5G: fifth generation
ACK: acknowledgement
AMF: access and mobility management function
AP: access point
AS: access stratum ASIC: application-specific integrated circuit
CG: configured grant
CM: connection management
CN: core network
CP: control plane
CPS: cyber-physical system
CU: centralized unit
DRB: data radio bearer
DSP: digital signal processor
DSDP: digital signal processing device
DU: distributed unit
(e/g)NodeB: (evolved/next generation) node B
E-UTRA: evolved UMTS terrestrial radio access
E-UTRAN: evolved universal mobile telecommunications system radio access network
FPGA: field programmable gate array
GEO: geostationary earth orbit
GHz: gigahertz
gNB: next generation nodeB
H(e/g)nodeBs: home (evolved/next generation) node Bs
HNB: home node B
HNB-GW: home node B gateway
IAB: integrated access and backhaul
ICT: information and communications technology
IMS: Internet Protocol multimedia subsystems
IP: internet protocol
IoT: internet of things
LEO: low earth orbit
LTE: long term evolution
LTE-A: long term evolution advanced
MANET: mobile ad-hoc network
MEC: multi-access edge computing
MME: mobile management entity
mMTC: (massive) machine-type communications
MSGA: preamble and payload transmissions of the random access procedure for a
two-step random access type
MSG3: first scheduled transmission of random access procedure
MT: mobile termination
M2M: machine-to-machine
NG: next generation
NGC: next generation core
NR: new radio
NVF: network function virtualization
PCS: personal communications services
PDA: personal digital assistant
P-GW: packet data network gateway
PLD: programmable logic device
RAM: random access memory
RAN: radio access network
RAT: radio access technology
RI: radio interface
RNA: radio access network-based notification area
ROM: read only memory
RRC: radio resource control
S-GW: serving gateway
SDN: software defined networking
SDT: small data transmission
SIM: subscriber identification module
SRB: signaling radio bearer
th: threshold
UE: user device or user equipment
UL: uplink
UMTS: universal mobile telecommunications system
UPF: user plane function UTRAN: universal mobile telecommunications system radio access network UWB: ultra-wideband WCDMA: wideband code division multiple access WiFi: wireless local area network WiMAX: worldwide interoperability for microwave access WLAN: wireless local area network

The invention claimed is:

1. An apparatus comprising
at least one processor; and
at least one memory including computer program code, the at least one memory and computer program code configured to, with the at least one processor, cause the apparatus at least to:
receive, from a network device, information for a small data transmission procedure in an inactive state, the information indicates at least a limit to be used during the small data transmission procedure, wherein the limit indicates an amount of uplink data that the apparatus is at least allowed to transmit during the small data transmission procedure; and
determine, during the small data transmission procedure in the inactive state, whether the amount of uplink data transmitted or to be transmitted exceeds the limit;
in response to the amount exceeding the limit, at least one of: abort the using for the uplink data the small data transmission in the inactive state, cause to transmit a radio resource control resume request, cause to transmit a radio resource control setup request, cause to trigger a buffer status report, indicate in a user equipment assistance information message a preferred radio resource control state to be radio resource control connected, or cause to indicate in signaling that the amount exceeds the limit or causing radio resource control state transition to radio resource control idle; and
determine that the amount of the uplink data that exceeds the limit in response to the amount of uplink data to become available to be transmitted during the uplink data transmission causing that the limit is exceeded, or in response to the amount of uplink data that has been transmitted to exceed the limit while there is still uplink data waiting to be transmitted.

2. The apparatus of claim 1, wherein the at least one memory and computer program code configured to, with the at least one processor, further cause the apparatus to:
determine, during the small data transmission procedure in the inactive state, the amount of uplink data to be transmitted by calculating at least one of: an amount of uplink data waiting to be transmitted, an amount of uplink data becoming available to be transmitted during the small data transmission procedure, or an amount of uplink data transmitted during the small data transmission procedure.

3. The apparatus of claim 2, wherein the amount of uplink data comprises at least one of: small data transmission data, non-small data transmission data, data for one or more small data transmission data radio bearers, data for one or more small data transmission signaling radio bearers, control plane data, user plane data, small data transmission data with headers, non-small data transmission data with headers, data for one or more small data transmission data radio bearers with headers, data for one or more small data transmission signaling radio bearers with headers, control plane data with headers, and user plane data with headers.

4. The apparatus of claim 1, wherein the at least one memory and computer program code configured to, with the at least one processor, cause the apparatus further to at least perform transmitting the uplink data using the small data transmission procedure if a permission to exceed the limit during the uplink data transmission is received from the network device.

5. The apparatus of claim 4, wherein the permission is received in at least one of a control element in medium access control, a radio resource control message, an uplink grant or downlink transmission.

6. The apparatus of claim 1, wherein the at least one memory and computer program code configured to, with the at least one processor, cause the apparatus further to at least perform:
determine, when receiving from the network device the information indicating at least one limit, a limit to be equal to a data volume threshold for initiating the small data transmission procedure in the inactive state, or to be equal to a further threshold in the information, or to be an indicated amount bigger than the data volume threshold.

7. An apparatus configured to provide wireless access to devices, the apparatus comprising
at least one processor; and
at least one memory including computer program code, the at least one memory and computer program code configured to, with the at least one processor, cause the apparatus at least to:
signal to at least one device of the devices information for a small data transmission procedure in an inactive state, the information indicates to the at least one device at least a limit to be used, by the at least one device, during the small data transmission procedure, wherein the limit indicates an amount of uplink data at least allowed to be transmitted during the small data transmission procedure; and
determine, in response to receiving from the device information indicating that the limit is exceeded, how the device continues uplink data transmission; and
signal to the device, an indication how to continue the uplink data transmission.

8. The apparatus of any one of claim 7, wherein the at least one limit is a general limit or a limit per a data radio bearer, or limit per a signaling radio bearer.

9. A method comprising:
receiving, in an apparatus, from a network device, information for a small data transmission procedure in an inactive state, the information indicates at least a limit to be used during the small data transmission procedure, wherein the limit indicates an amount of uplink data that the apparatus is at least allowed to transmit during the small data transmission procedure; and
determining, by the apparatus, during the small data transmission procedure in the inactive state, whether the amount of uplink data transmitted or to be transmitted exceeds the limit:
in response to the amount exceeding the limit, at least one of: abort the using for the uplink data the small data transmission in the inactive state, cause to transmit a radio resource control resume request, cause to transmit a radio resource control setup request, cause to trigger a buffer status report, indicate in a user equipment assistance information message a preferred radio resource control state to be radio resource control connected, or cause to indicate in signaling that the amount exceeds the limit or causing radio resource control state transition to radio resource control idle; and determine that the amount of the uplink data that exceeds the limit in response to the amount of uplink data to become available to be transmitted during the uplink data transmission causing that the limit is exceeded, or in response to the amount of uplink data that has been transmitted to exceed the limit while there is still uplink data waiting to be transmitted.

* * * * *